(12) United States Patent
Starcevic

(10) Patent No.: US 6,846,418 B2
(45) Date of Patent: Jan. 25, 2005

(54) PROCESS FOR TREATING ACIDIC AND METALLIC WASTE WATER

(75) Inventor: Jovan Starcevic, Vienna (AT)

(73) Assignee: Andritz AG, Graz (AT)

( * ) Notice: Subject to any disclaimer, the term of this patent is extended or adjusted under 35 U.S.C. 154(b) by 184 days.

(21) Appl. No.: 10/289,212

(22) Filed: Nov. 7, 2002

(65) Prior Publication Data

US 2003/0089671 A1 May 15, 2003

(30) Foreign Application Priority Data

Nov. 7, 2001 (AT) ..................................... A 1755/2001

(51) Int. Cl.[7] .............................................. B01D 61/00
(52) U.S. Cl. ...................... 210/651; 210/181; 210/638; 210/639; 423/394.2; 423/484; 134/22.16
(58) Field of Search ................................. 210/650, 651, 210/767, 652, 638, 639, 195.2, 257.2, 180, 175, 805; 423/394.2, 484, 488, 106, 108; 75/658; 134/22.16, 22, 27, 33; 204/206

(56) References Cited

U.S. PATENT DOCUMENTS

| | | | | |
|---|---|---|---|---|
| 4,655,928 A | * | 4/1987 | Milton et al. ................ | 210/651 |
| 5,051,186 A | * | 9/1991 | Prior .......................... | 210/638 |
| 5,149,515 A | | 9/1992 | Karner et al. | |
| 5,190,740 A | * | 3/1993 | Narutani et al. ......... | 423/594.1 |
| 5,382,335 A | | 1/1995 | Jirenec et al. | |
| 5,403,490 A | * | 4/1995 | Desai ......................... | 210/652 |
| 5,500,098 A | | 3/1996 | Brown et al. | |
| 5,800,694 A | | 9/1998 | Starcevic et al. | |
| 5,938,913 A | | 8/1999 | Starcevic et al. | |
| 5,980,850 A | | 11/1999 | Lebl | |
| 6,030,433 A | * | 2/2000 | Luggenhorst et al. ......... | 75/658 |
| 6,120,671 A | | 9/2000 | Karner et al. | |
| 6,179,908 B1 | * | 1/2001 | Braun et al. ................ | 106/456 |
| 6,210,650 B1 | | 4/2001 | Karner et al. | |
| 6,375,915 B1 | | 4/2002 | Barhold et al. | |
| 6,398,876 B1 | | 6/2002 | Starcevic et al. | |
| 6,451,280 B1 | | 9/2002 | Lebl | |

* cited by examiner

*Primary Examiner*—Ana Fortuna
(74) *Attorney, Agent, or Firm*—Roylance, Abrams, Berdo & Goodman, L.L.P.

(57) ABSTRACT

A process for treating acidic and metallic waste water, particularly the rinsing water and/or used acids from pickling plants. The process includes the step of adding an alkaline solution or gas to bind the free acids in the waste water, followed by separation of the waste water into a first partial stream with high metal content and a second partial stream with low metal content. To achieve a more economical embodiment, particularly in terms of favorable energy consumption, and also reduce the nitrate load as much as possible, the free acids are bonded by adding ammonia solution or gas, and the first partial stream with the high metal content is fed to a regeneration plant to undergo pyrohydrolytic treatment, preferably by spray roasting. The second stream can be recycled to a rinse station.

32 Claims, 3 Drawing Sheets

PROCESS FOR TREATING ACIDIC AND METALLIC WASTE WATER

FIELD OF THE INVENTION

The invention relates to a process for treating acidic and metallic waste water, particularly the rinsing water and/or used acids from pickling plants. The invention is particularly directed to the addition of an alkaline solution or gas to the waste water and binding the free acids in the waste water, followed by separation of the waste water into a first partial stream with high metal content and a second partial stream with low metal content.

BACKGROUND OF THE INVENTION

The waste water (flushing water, rinse water and spent acid) from a mixed acid pickling bath, for example, is usually sent to a neutralization stage where it is neutralized with milk of lime. The resulting mixture is then filtered and discharged. The fluorides and metals remain in the filter cake. The entire nitrate content of the filtrate, on the other hand, enters the main output. Since the nitrate content in the waste water is now being subjected to more and more stringent regulations, "nitrate-free" pickling has been suggested which uses sulfuric acid, hydrofluoric acid or hydrogen peroxide, for example, as pickling acid medium.

The disadvantage of this, however, is that the surface quality of the treated metal is not quite as good and the amount of sludge produced after neutralization is increased by 100%, involving higher costs for disposal. Another solution that has been suggested for reducing nitrate content is pyrohydrolytic treatment of the neutralized waste acid, which results in a 70–90% reduction in nitrate content for the used acid. However the nitrate load from the flushing water remains in the waste water. Accordingly, there is a continuing need in the industry for improved processing to remove nitrates from waste water.

SUMMARY OF THE INVENTION

The present invention is directed to a process for treating acidic waste water and regenerating pickling acids. The invention is further directed to a process for regenerating pickling acids while reducing the nitrate content of waste water discharged from the process where the treated waste water can be recycled to a rinse station or can be discharged.

Accordingly, an object of the invention is to improve conventional processes to make the processes more economical, particularly in terms of energy consumption, as well as to reduce the nitrate load as much as possible and also recover volatile acids including, for example, hydrochloric acid, nitric acid, and hydrofluoric acid.

According to the present invention, acids in a waste water stream are bonded by ammonia, which is added to the waste water. The resulting waste water is separated into a first stream with a high metal content which is fed to a regeneration plant to undergo pyrohydrolytic treatment, preferably by spray roasting. The use of ammonia, i.e. ammonium ion ($NH_4^+$), in place of alkaline or alkaline earth ions produces decomposable salts in the subsequent acid regeneration. The ammonia also enables acids, for example, hydrofluoric acid (HF), to be extracted from the waste water as ammonium fluoride ($NH_4F$). Due to pyrohydrolytic regeneration, which is preferably in a spray roasting process, the nitrates largely decompose into $NO_x$ gases. The $NO_x$ gases can be converted into nitrogen and water in $DeNO_x$ catalytic converters in a further step. Non-decomposed nitrates are recovered in the form of nitric acids. Thus, pyrohydrolytic regeneration enables the waste water to be substantially free of nitrates. Since by far the larger content of metal and acid remains in one of the two partial streams, only this one stream need undergo further treatment, while the other with its substantially lower metal and acid content can easily be disposed of or recycled into those processes from which the waste water was taken. The neutralization process with ammonia reduces the free, aggressive radicals normally in the solution so that favorable materials can be used for the separation stage (e.g. evaporation plant or membrane filtration).

The aspects of the invention are basically attained by providing a process of treating waste water containing acidic and metallic waste water from pickling plants. The process comprises the steps of adding an aqueous ammonium solution, ammonia gas or ammonia providing compound, such as urea, to the waste water and bonding free acids in the waste water; separating the waste water into a first partial stream having high metal content and a second partial stream with low metal content, and feeding the first partial stream with the high metal content to a regeneration plant and pyrohydrolytically treating the partial stream with the high metal content. The second stream has a low nitrate concentration and a higher pH than the concentrate in the first stream so that the second stream can be recycled as wash or rinse water.

The aspects of the invention are further attained by providing a process for regenerating an acid solution comprising the step of admixing ammonia or an ammonium compound with a spent pickling acid feed containing dissolved metal salts to form ammonium salts with an anion of the spent pickling acid solution. A concentrated first acid waste stream is produced from the spent pickling acid solution where the first acid stream has a higher concentration of the metal salts than the spent pickling acid feed, and the concentrated first acid solution is thermally decomposed and an acid solution is regenerated.

The aspects of the invention are still further attained by providing a process for treating waste water containing spent acids and dissolved metals. The process comprises the steps of: admixing a base with the waste water where the base is selected from the group consisting of ammonia or an ammonia-producing compound, and where the waste water is rinse water from a pickling process containing spent pickling acids. The base is admixed in an amount to react with the free acids and to raise the pH of the waste water. The waste aqueous acid is separated into a first acid waste stream containing a first concentration of metal salts and a second stream containing a second concentration of metal salts, where the first concentration is higher than the second concentration. The first acid waste stream is fed to a pyrohydrolytic acid regenerator and an acid is regenerated. The second stream is recycled to the rinse stage of the pickling process.

These and other aspects of the invention will become apparent from the drawings and the following detailed description of the invention.

BRIEF DESCRIPTION OF THE DRAWING

The following is a brief description of the drawings in which.

DETAILED DESCRIPTION OF THE INVENTION

Figure 1:
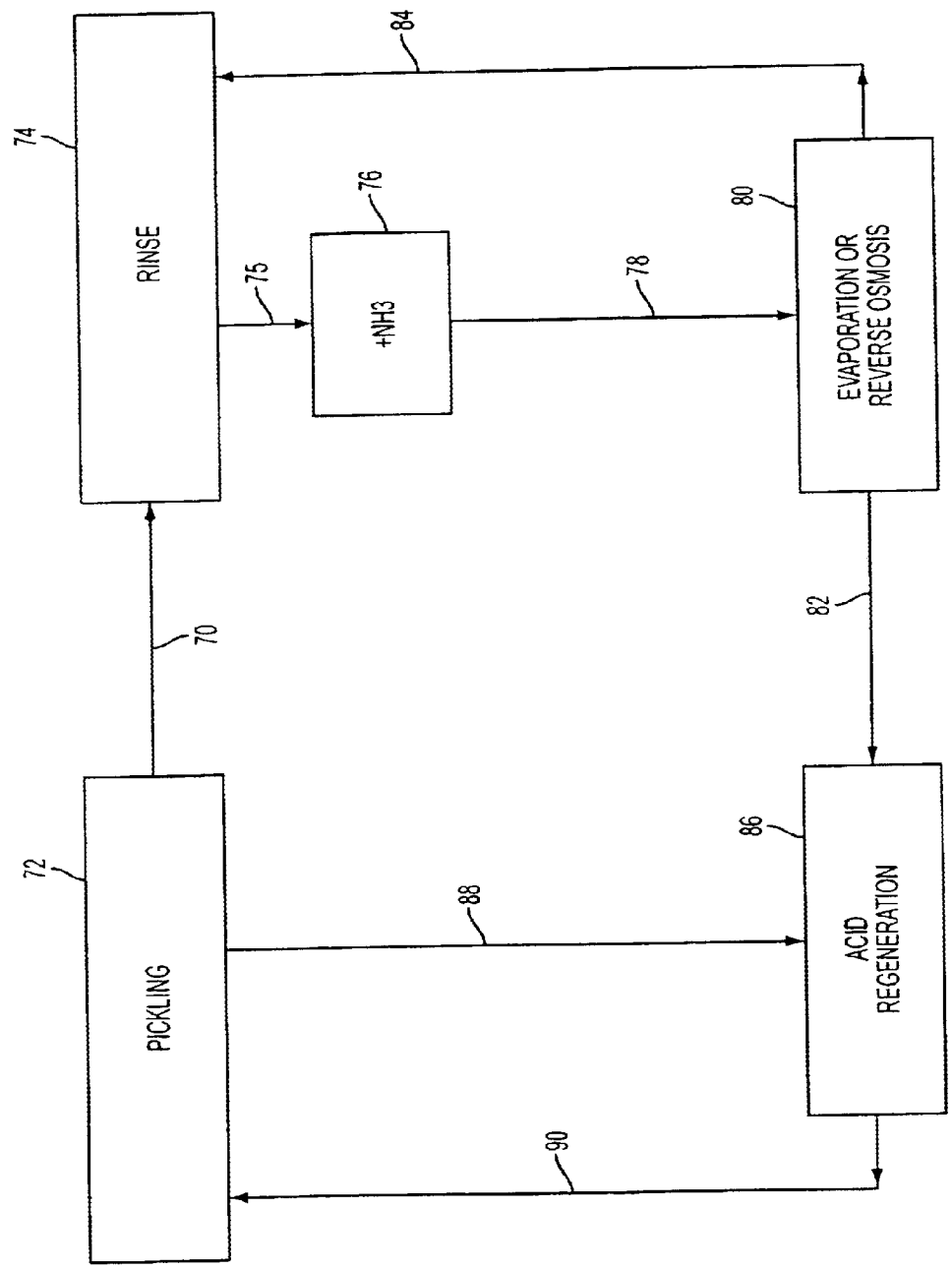
FIG. 1 is a schematic diagram showing a processing plant for regenerating acids in one embodiment.

The present invention is directed to a process for regenerating acids from spent acid waste water containing dissolved metal ions and spent pickling acids. The invention is particularly directed to a process for regenerating acids from waste water containing spent pickling acids that contain nitric acid while reducing the $NO_x$ content of exhaust gases and waste water produced in the acid regeneration process.

According to a preferred embodiment, the invention is directed to a process of treating acidic waste water that contains metal ions and separating the acidic waste water into a first partial stream having high metal content with a low proportion of the original volume, and a second partial stream having a low metal content with a high proportion of the original volume of the waste water. Thus, further treatment and/or disposal of the first partial stream with high metal and acid content is favorable because its quantity or volume is substantially reduced compared to the amount of largely untreated waste water. The reduced volume enables a higher proportion of the acids in the waste water to be recovered and regenerated into pickling acids.

The present invention is directed to a process for treating aqueous solutions containing spent acids and solubilized metals, which are typically in the form of metal salts and metal hydroxides. The invention is particularly directed to regenerating acids from spent pickling acids and wash water containing spent acids and dissolved metals from a pickling plant.

Steel and stainless steel pickling plants generally use various acids and mixtures of acids to treat the surface of the steel or stainless steel substrate to remove the scale. The acids can be, for example, hydrochloric acid, nitric acid, hydrofluoric acid, and mixtures thereof. In one embodiment, the pickling acid is a mixture of hydrofluoric and nitric acid. The pickling process removes the scale, solubilizes the various metals and produces metal salts and metal hydroxides. The dissolved metals in the spent pickling acid are typically metal ions including, for example, ferric ions, ferrous ions, magnesium, chromium, manganese ions, and others depending on the metal being treated and the composition of the pickling acid. The wash or rinse water from the pickling process also contains mixtures of acids and solubilized metal compounds.

The process of the invention is particularly suitable for regenerating acids from waste rinse water containing nitric acid or mixtures of nitric acid with other acids by admixing the waste rinse water stream with ammonia, an ammonium compound or ammonia providing compound. In one embodiment, the waste water from a pickling rinse is treated with an alkaline solution. Without any intervening process steps, the resulting waste water stream is separated into a first acid concentrate stream having a high acid and a high metal ion content and second stream having a low acid and a low metal content. The ammonia, ammonium compound or ammonia providing compound such as urea is admixed in an amount such that the second stream has a higher pH than the pH of the first stream and higher than the pH of the waste water.

The process according to the invention regenerates acids from wash water from a pickling rinse station, and mixtures of wash water and spent acids. An aqueous stream containing waste or spent acids and dissolved metals is admixed with ammonia, an ammonia source or an ammonium compound to bind with the acids. The resulting stream containing the acids, metals and the resulting ammonia or ammonium compounds produced in the mixture is concentrated by removing water to produce a first acid stream with a higher concentration of acids, metal salts and metal hydroxides. Typically, the concentrated first acid stream has a pH of 3 or less. The concentrated first acid stream is then fed to an acid regeneration facility to regenerate the acids. In preferred embodiments, the acid regeneration plant is a spray roasting reactor.

The process of the invention is particularly suitable for regenerating acids from waste water streams obtained from wash or rinse water from the rinse station in a pickling plant and for producing wash water that can be recycled to the rinse station. FIG. 1 is a schematic diagram of one embodiment of the invention. As shown in FIG. 1, a steel strip 70 is directed into a pickling tank 72 containing pickling acids where the acids treat the steel. The steel strip 70 is then directed to a rinse station 74 where rinse water removes the acid residue on the steel. The steel is then discharged from the rinse station. The rinse waste water containing the spent pickling acids and dissolved metals is collected and directed through a line 75 to a mixing tank 76. The ammonia or ammonia providing compound is admixed with the spent wash water to adjust the pH and directed through a line 78 to a concentrator 80. The concentrator 80 can be an evaporator or reverse osmosis device which produces a first concentrated stream 82 and dilute second stream 84. The dilute second stream 84 is recycled to the rinse station 74. The first concentrated stream 82 is directed to an acid regenerator 86. The first concentrated acid stream 82 can be mixed or combined with spent pickling acids immediately before acid regeneration, where the spent pickling acids are supplied through a line 88 from pickling tank 72. The pickling acids are regenerated and returned to pickling tank 72 through a line 90.

The waste water stream is combined with an amount of ammonia or an ammonium compound. The resulting solution is then concentrated to form an acid stream having a high acid concentration and metal salt concentration comparable to the concentration of a standard spent pickling acid solution. The resulting concentrated acid stream is then fed to acid regenerating facility 86 such as a spray roasting reactor.

The process is also suitable for waste water solutions containing volatile acids such as hydrofluoric acid and nitric acid. The addition of the ammonia or ammonium compound to the waste water combines with the acids to reduce the volatility of the acids. The waste water can then be directed to an evaporator to drive off water vapor and produce a first concentrated acid stream. The addition of the ammonia or ammonium compound to the acid stream reduces the amount of the hydrofluoric acid and nitric acid that is volatilized in the evaporation stage so that the concentration of the acids increase in the first acid stream to produce a low pH. The vapors from the evaporator are condensed to form a second stream that contains relatively low levels of acids and ammonia and has a higher pH compared to the first acid stream. The second aqueous stream also contains low levels of nitrates and nitrites and can be used as wash or rinse liquid downstream of a pickling tank or can be discharged to a waste water stream.

The composition of the second stream obtained from the evaporator or membrane separator is affected by the amount of ammonia or the ammonium compounds admixed with the waste water containing the spent acid. Increases in the amount of ammonia or ammonium compound admixed with the waste acid has a small effect on the pH of the resulting first concentrate acid stream. It has been found that increasing the amount of ammonia or ammonium compound admixed with the waste water stream reduces the $NO_x$ content of the second stream obtained from the evaporator or membrane separator. Increasing the amount of ammonia or ammonium compound also raises the pH of the second stream in relation to the pH of the first acid stream and the pH of the waste water feed. Typically, the second stream has a sufficiently low $NO_x$ concentration so that the stream can be recycled as rinse water or can be discharged with little or no further $NO_x$ removal processing. The $NO_x$ in the second stream is generally in the form of $NO_3^-$.

The invention is also directed to a process for regenerating pickling acids from wash or rinse water containing spent pickling acids and dissolved metal salts by the admixing of ammonia or an ammonium compound to the spent acids in an amount to bind with the acids and retain the acids in solution. The waste acid stream is then separated into a first acid concentrate stream containing high levels of dissolved metal ions and a second acid stream containing low levels of acids and dissolved metal ions. The waste acid stream is typically separated so that the second stream has a greater volume than the volume of the first stream. The first acid stream concentrate is directed to an acid regenerator to recover the acids and regenerate the acids.

In one embodiment, the invention provides a method of reducing $NO_x$ emissions in exhaust gases and waste water. The process admixes ammonia or an ammonium compound with a waste water stream containing spent nitric acid and dissolved metal ions. The resulting acid stream is separated into a first acid stream having a high concentration of nitric acid and ammonium salts and a second stream having a low concentration of nitric acid and ammonium compounds with respect to the concentration of nitric acid in the acid stream.

According to a further embodiment of the invention, the waste water is treated with ammonia or an ammonium compound and split into two partial streams with low energy consumption using a membrane separation process, preferably by reverse osmosis. With this type of process, partial stream ratios of up to 3:7 are attainable, with the larger share of metals and acids remaining in the smaller stream. The preceding neutralization stage by the addition of the ammonia or ammonium compound enables the use of membrane materials customary in trade. Separation behavior and efficiency are improved by the prior addition of the ammonia or ammonium compound than can be obtained from the mixed acids alone. The first acid concentrate stream contains high levels of the acid, metal salts and $NO_x$ compounds while the permeate contains low levels of metal salts, $NO_x$ compounds and has a higher pH than the first acid stream.

In order to obtain even higher volume ratios between the two waste water partial streams, the process according to the invention splits the waste water into two partial streams by evaporating at least 50% of the acid waste water feed stream and condensing the distillate. Preferably, the waste water or waste acid is evaporated by at least about 70%, and more preferably at least 90% by volume. The salts in the first partial stream with lower volume are concentrated to an extent corresponding approximately to the concentration of spent pickling acids so that acid recovery is particularly economical. In other embodiments, volume ratios of about 1:9 or more are obtained by evaporation at a relatively low cost.

Figure 2:
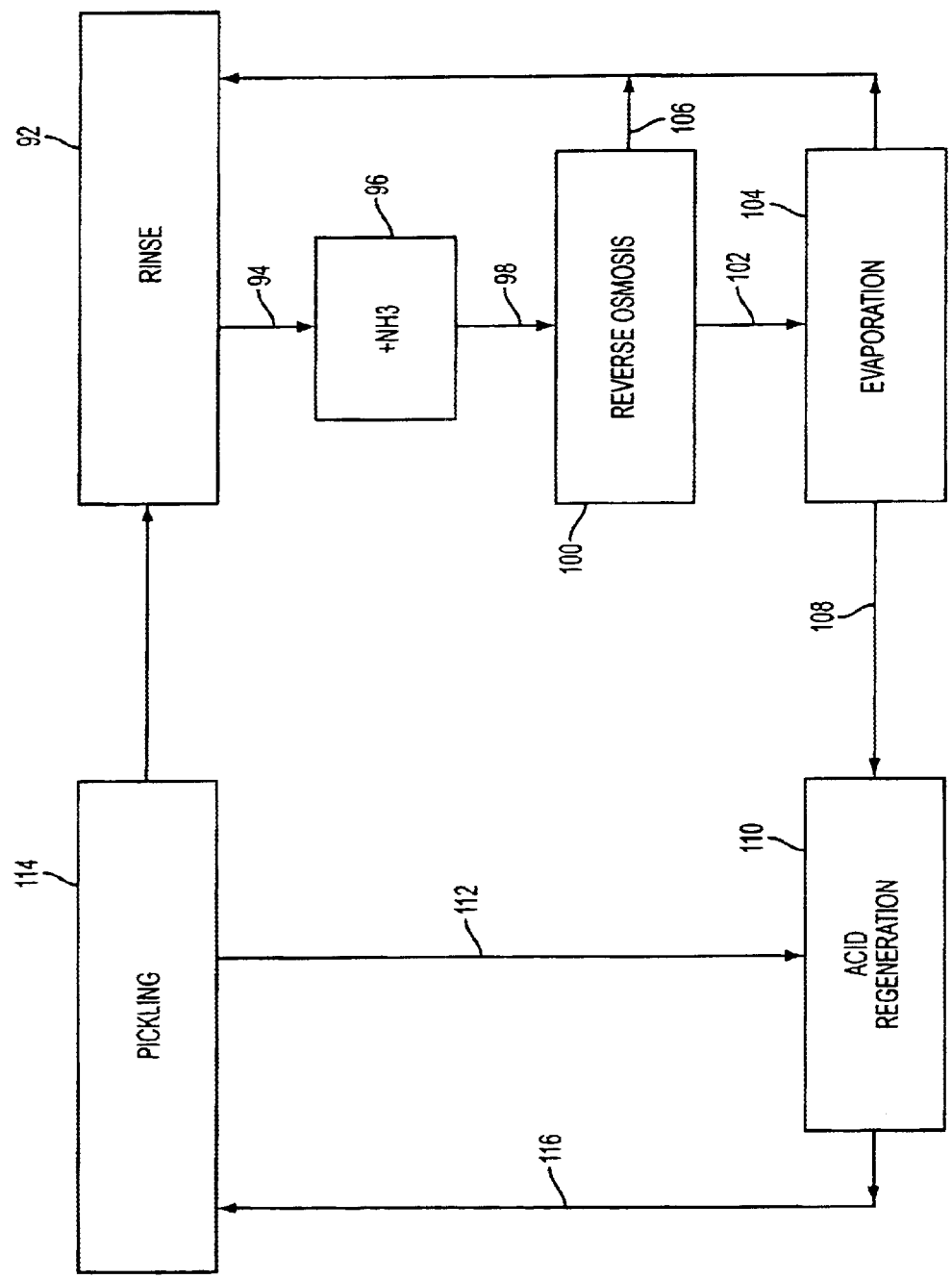
FIG. 2 is a schematic diagram showing the processing plant in a second embodiment.

A particularly advantageous embodiment of the invention combines the two variants mentioned above as shown schematically in FIG. 2. The waste water is removed from a pickling rinse tank 92 through a line 94 and mixed with ammonia in a mixing vessel 96. The mixture is directed through a line 98 and is split into the two partial streams in a membrane separation device 100, such as by reverse osmosis. A first concentrate stream is directed through line 102 to an evaporator 104 and a second dilute stream is recycled through line 106 to rinse tank 92. The first concentrate stream is further concentrated by evaporation in evaporator 104 by at least 50% based on the concentration of the first stream. In one embodiment, the stream is evaporated by at least 70% in the process, and preferably by at least 90%. The concentrate is directed through line 108 to the acid regenerator 110 which can also receive acids through line 112 from a pickling tank 114. The regenerated acids are then returned to the pickling tank through line 116.

In order to make the evaporation process easier and require less maintenance, it can be preceded by at least one filtration stage. The filtration stage mainly removes the metal hydroxides from the feed stream, which can cause encrusting on the evaporator surfaces.

A further reduction in the nitrate content of the feed stream and the nitrate content of the second stream from the separator is attained by adjusting the pH-value of the feed waste water stream to between 2 and 8, preferably between 3 and 5, by the addition of the ammonia or ammonium compound. In one embodiment, ammonia or ammonia providing compound is admixed with the waste stream to adjust the pH to about 2–14, and preferably about pH 4–6. This avoids excessive chemical consumption, but still bonds at least the free acids and reduces the nitrate content of the condensate from the evaporator or permeate from the membrane separator.

In one preferred embodiment of the invention, the exhaust vapor from evaporation is collected, condensed and recycled to the wash or rinse process. The vapor from the evaporator is only slightly contaminated with ammonia, so there is no need for an additional cleaning stage before returning it to the process. The vapor from the evaporator can be subjected to an ion exchange or membrane separation process in order to obtain even better cleanness.

With the process stages of the invention, it is possible to obtain a nitrate content in the second partial stream intended for disposal or for the simplified further treatment that is able to meet the more and more stringent environmental regulations. For example, nitrate reductions are possible in the range of 90% and more based on the nitrate content of the waste water stream.

In preferred embodiments of the invention, gaseous ammonium is injected into the waste water stream contained in the storage vessel. Alternatively, ammonium compounds such as ammonium hydroxide solution and ammonia providing compounds such as urea that are able to provide a source of ammonium in the waste water can be used. Generally, ammonia is admixed with the waste acid in an amount of at least 4 g/l of the waste acid. In one embodiment, ammonia is admixed with the waste acid in an amount of about 4–10 g/l, and preferably at least about 4.5 g/l of waste acid. In one embodiment, the amount of ammonia admixed can be at least about 5.5 g/l. In another embodiment, ammonia is admixed with the waste acid in an amount of at least 8 g/l of waste acid. Ammonium compounds are admixed in amounts to provide equivalent amounts of ammonia to the waste acid.

In preferred embodiments, the ammonia or ammonium compounds are admixed in amounts to adjust the pH of the waste acid to about pH 2.0 or higher. In one embodiment of the invention, the pH of the waste acid is adjusted to about 2 to about 8, and preferably about 3 to about 5, by the addition of the ammonia or ammonium compound.

The amount of ammonia or ammonium compound admixed with the waste water stream in an amount whereby the condensate from an evaporation stage has a $NO_3^-$ concentration of about 1 mg/l or less and a pH of about 3.0 or higher. In further embodiments, the ammonia or ammonium compound is admixed in amounts to produce a condensate having a $NO_3^-$ concentration of less than 1 mg/l and a pH of at least about 6. In another embodiment, the ammonia or ammonium compound is admixed in an amount to produce a condensate having a pH of at least about 8.0.

Figure 3:
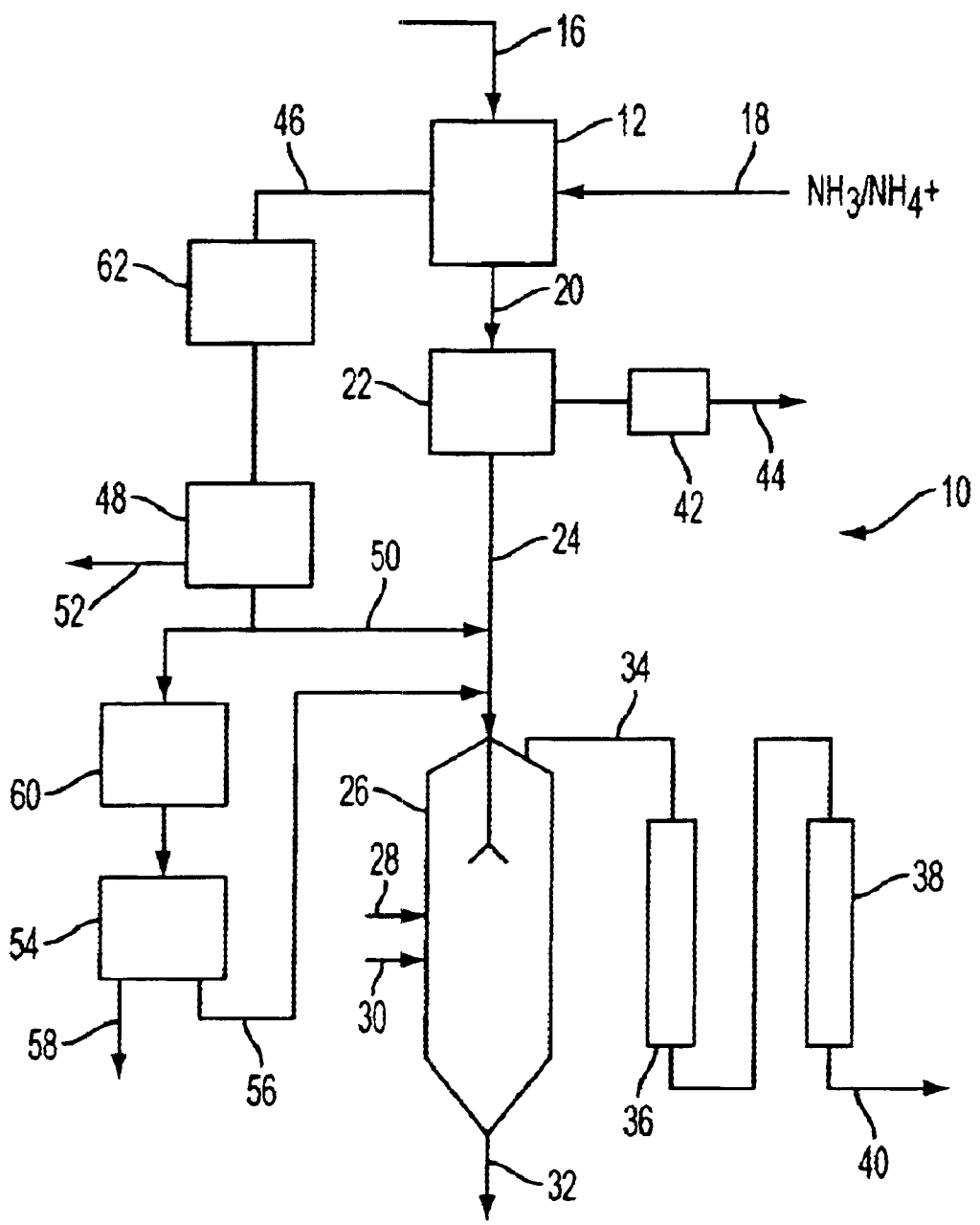
FIG. 3 is a schematic diagram showing another embodiment of the invention.

Referring to FIG. 3, an aqueous waste water solution containing an acid and dissolved metal salts is directed to and contained in a storage vessel 12. The aqueous waste rinse water can be supplied through line 14 to feed the spent rinse water containing acids such as nitric acid, hydrochloric and hydrofluoric acid. Generally, the spent rinse water contains a mixture of acids that include nitric acid. In this embodiment, the aqueous waste acid solution in storage vessel 12 is admixed with ammonia or an ammonium compound that is fed into the vessel through a line 18. The ammonia or ammonium compound is added in an amount to bind with the acids, and particularly the nitric acids in the solution.

The resulting mixture from vessel 12 is supplied through a line 20 to an evaporator 22. The evaporator 22 can be a single or two stage evaporator as known in the art. In one preferred embodiment, the evaporator is a two stage vacuum evaporator operating at a temperature of about 100° C. and about 0.5 bar. In the evaporator 22, water and a minor portion of the volatile acids are removed as vapor or gaseous materials to reduce the volume of the waste acid solution and produce a concentrated first waste acid stream. The metal salts and a major portion of the acids in the waste acid feed are concentrated in a reduced volume of the first waste acid stream which exits the evaporator 22 through line 24. The volume of the waste acid feed exiting through line 24 is generally reduced at least about 50%, typically at least about 70%, and most preferably about 90%. The first waste acid stream can be passed through a filter before feeding to the evaporator to inhibit the formation of scale and deposits in the evaporator. This first waste acid stream is withdrawn from the evaporator through line 24 and fed into an acid regenerator 26. In a preferred embodiment, the acid regenerator 26 is a spray roasting reactor where fuel and air are supplied into the reactor 26 through lines 28, 30, respectively, to produce acid and water vapor and form particles of the metal salts. The particles of the metal salts fall downwardly through the reactor and are discharged through an outlet 32. The acid vapors are withdrawn from the reactor 26 through a line 34 and directed to a scrubber 36 and adsorption column 38 to regenerate the acids. The regenerated acids are discharged through line 40 where they can be recycled to the pickling plant. The exhaust gases generally contain low levels of $NO_x$ so that the exhaust gases are typically directed to $NO_x$ removing columns or other $DeNO_x$ devices. An example of a suitable spray roasting reactor and acid regenerating plant is disclosed in U.S. Pat. No. 5,980,850, which is hereby incorporated by reference in its entirety. The addition of the ammonia or ammonium compound to the waste acid feed enables high recovery of the nitric acid in the scrubber and reduces the amount of $NO_x$ in the exhaust gas from the spray roasting reactor and acid regenerating system.

The water vapor, vaporized acids and other volatile components are separated from the evaporator 22 and directed to a condenser 42 where the vapors are cooled and condensed. The resulting condensed liquid phase is discharged from the condenser through a line 44 as a second stream. It has been found that the addition of ammonia or an ammonium compound to the waste acid feed in the storage vessel 12 before concentrating the acid feed results in smaller amounts of the acids being vaporized in the evaporator 22 and being carried over in the condensate. The resulting condensate has lower nitrate concentration, referred to as $NO_x$, and a higher pH than the condensate obtained from the evaporation of spent acids without the addition of ammonia or ammonium compounds. The second stream can be recycled to the rinse water as discussed above. In one embodiment, the condensate from the evaporator forming the second stream is passed through an ion exchange column or membrane separator before discharging or recycling to the waste acid feed.

In an alternative embodiment, the waste water feed containing the added ammonia is directed from the storage vessel 12 through a line 46 to a membrane separator 48. Preferably, the membrane separator 48 is a reverse osmosis separator. The reverse osmosis separator produces a first acid stream having a higher concentration of metal salts and acids than the acid feed. The first acid stream is carried from the separator 48 through a line 50 is fed to the acid regenerator 26 as in the previous embodiment. The aqueous phase or permeate passing through the reverse osmosis membrane forms the second acid stream and is discharged through a line 52. The second acid stream preferably has a volume greater than the first acid stream and an acid concentration and metal salt concentration less than the first acid stream.

The second stream typically contains low levels of $NO_x$ and can be recycled to the pickling plant for use as wash water. Alternatively, the second stream can be discharged or passed to a further processing facility to recover the acids and metal salts in the stream.

In one embodiment, the first stream is supplied to an evaporator 54. The second stream is evaporated to reduce the volume by at least 50%, typically at least 70%, and preferably at least 90%. The resulting concentrate contains the acids and metal salts which can then be fed to the acid regenerator, such as the spray roasting reactor 26 through a line 56. The distillate from the evaporator 54 can be recycled or discharged through a line 58 as desired. In another embodiment, the second stream from separator 48 can be passed through a filter 60 to remove metal hydroxides and other sludge before feeding to the evaporator 54. Typically, a filter 62 is provided between storage vessel 12 and membrane separator 48 to remove sludge and other solids before feeding to the membrane separator 48.

The following examples demonstrate the effects of adding ammonia to a wash water from a rinse station in a pickling process. In particular, these examples demonstrate the reduced amount of volatile acids carried over in the distillate from an evaporation stage. The examples particularly show that increasing the amount of ammonia added to a waste water stream containing nitric acid reduces the amount of $NO_x$ that is carried in the vapor phase from evaporation of the acid stream.

EXAMPLE 1

A rinse water from a stainless steel pickling plant using hydrofluoric acid as the pickling acid was used as the aqueous feed solution containing spent acid and solubilized metal salts. The feed solution contained

| | |
|---|---|
| $Fe^{3+}$: | 2.57 g/l |
| $Cr^{3+}$: | 0.52 g/l |
| $Ni^{2+}$: | 0.30 g/l |
| Σ HF: | 4.4 g/l |

The rinse water was combined with 3.4 g/l of gaseous ammonia to adjust the pH to 2.5. No precipitation of metal salts or metal hydroxides occurred at this pH. The resulting solution was then fed to a two stage vacuum evaporator. The vacuum evaporator heated the waste aqueous acid solution using a water bath to a temperature of 100° C. A vacuum of 0.5 bar was applied to the waste aqueous acid to reduce the volume of the waste aqueous acid 90% and form a first concentrate acid stream. The first concentrate acid stream was then fed to a spray roasting reactor to regenerate the pickling acids. The vapors, which included water vapor and volatile acids recovered from the evaporator were condensed to form a second waste acid stream. The second waste acid stream had a pH of 2.5 and contained the following

| | |
|---|---|
| $NO_3^-$: | 11 mg/l |
| $F^-$: | 192 mg/l |
| $NH_4^+$: | 6 mg/l |

As shown in this example, the amount of ammonia added to the rinse water had only a small effect on the composition and pH of the distillate after evaporation.

EXAMPLE 2

The wash water of Example 1 was treated with 4.6 g/l gaseous ammonia which adjusted the pH to 3.32. The addition of the ammonia resulted in no precipitation. The resulting acid solution was fed to a two stage vacuum evaporator and evaporated at 100° C. under a vacuum of 0.5 bar. The volume of the acid solution was reduced 90% to produce a first concentrate acid stream. The first concentrate acid stream was directed to a spray roasting reactor and acid regenerator. The vapor phase from the evaporation was condensed and resulted in the second stream having a pH of 3.0. The second stream contained the following

| | |
|---|---|
| $NO_3^-$: | ~1 mg/l |
| $F^-$: | 121 mg/l |
| $NH_4^+$: | 8 mg/l |

EXAMPLE 3

The wash water of Example 1 was treated with 8.16 g/l gaseous ammonia which adjusted the pH to 6.93. The addition of the ammonia resulted in formation of precipitates. The resulting acid solution was fed to a two stage vacuum evaporator and evaporated at 100° C. under a vacuum of 0.5 bar. The volume of the acid solution was reduced 90% to produce a first acid stream which was fed to a spray roasting reactor and acid regenerator. The vapor phase from the evaporation was condensed and resulted in the second stream having a pH of 10.77. The second stream contained the following

| | |
|---|---|
| $NO_3^-$: | <1 mg/l |
| $F^-$: | 163 mg/l |
| $NH_4^+$: | 830 mg/l |

EXAMPLE 4

The wash water of Example 1 was treated with 5.7 g/l gaseous ammonia which adjusted the pH to 4.90. The addition of the ammonia resulted in immediate precipitation of sludge and solids. The resulting acid solution was fed to a two stage vacuum evaporator and evaporated at 100° C. under a vacuum of 0.5 bar. The volume of the acid solution was reduced 90% to produce a first concentrate acid stream which was fed to a spray roasting reactor and acid regenerator. The vapor phase from the evaporation was condensed and resulted in the second stream having a pH of 8.5. The second stream contained the following

| | |
|---|---|
| $NO_3^-$: | <1 mg/l |
| $F^-$: | 26 mg/l |
| $NH_4^+$: | 15 mg/l |

EXAMPLE 5

The wash water of Example 1 was treated with 5.7 g/l gaseous ammonia which adjusted the pH to 4.90. The addition of the ammonia resulted in slight precipitation of solids. The resulting acid solution was fed to a two stage vacuum evaporator and evaporated at 100° C. under a vacuum of 0.5 bar. The volume of the acid solution was reduced 50% to produce a first concentrate acid stream which was fed to a spray roasting reactor and acid regenerator. The vapor phase from the evaporation was condensed and resulted in the second stream. The second stream contained the following

| | |
|---|---|
| $NO_3^-$: | <1 mg/l |
| $F^-$: | 23 mg/l |
| $NH_4^+$: | 14 mg/l |

EXAMPLE 6

The wash water of Example 1 was treated with 5.7 g/l gaseous ammonia which adjusted the pH to 4.90. The addition of the ammonia resulted in slight precipitation of metal compounds. The resulting acid stream was fed to a reverse osmosis separator to reduce the volume of the acid stream 50%. The permeate contained the following

| | |
|---|---|
| $NO_3^-$: | 1 mg/l |
| $F^-$: | 5 mg/l |

EXAMPLE 7

The permeate of Example 6 was then fed to a two stage vacuum evaporator and evaporated at 100° C. and a pressure of 0.5 bar. The volume of the permeate was reduced 80% to produce a first acid stream. The vapor phase was condensed to produce an aqueous solution having a pH of 8.5 containing the following

| | |
|---|---|
| $NO_3^-$: | <1 mg/l |
| $F^-$: | 23 mg/l |
| $NH_4^+$: | 14 mg/l |

The above examples demonstrate the effects of the addition of ammonia to the waste acid before producing an acid concentrate. The examples particularly show that by adjusting the pH of the waste acid to 3.0 or higher results in a condensate or permeate from the separate having a reduced nitrate concentration and a higher pH. Increasing the amount of ammonia added to the waste acid stream reduces the amount of nitrates in the condensate or permeate. The ammonia binds with the acids and particularly the nitric acid to reduce the amount of nitric acid being carried over in the vapor phase of the evaporator or the permeate from the membrane separator.

While various embodiments of the invention have been described herein, it will be appreciated that various changes and modifications can be made without departing from the scope of the invention as defined in the appended claims.

What is claimed is:

1. A process for treating waste water containing acidic and metallic waste water from pickling plants, comprising the steps of
   adding an ammonium solution, ammonia gas or ammonia providing compound to said waste water and bonding free acids in said waste water,
   separating said waste water into a first partial stream having high metal content and a second partial stream with low metal content, and
   feeding said first partial stream with the high metal content to a regeneration plant and pyrohydrolytically treating said partial stream with said high metal content.

2. The process according to claim 1, comprising splitting said waste water to form said first partial stream with high metal content and a low proportion of volume, and to produce a second partial stream with low metal content and a high proportion of volume based on the volume of said waste water.

3. The process according to claim 2, comprising splitting said waste water into said first and second partial streams by passing said waste water through a membrane separation device.

4. The process of claim 3, wherein said membrane separation device is a reverse osmosis device.

5. The process according to claim 4, further comprising feeding said second stream from said reverse osmosis device to an evaporator and evaporating a volume of said second stream by at least 50%.

6. The process according to claim 2, comprising splitting said waste water into said first and second partial streams by evaporating at least 50% of said waste water to form a concentrate defining said first stream and producing a condensate defining said second stream.

7. The process according to claim 6, comprising evaporating said waste water by at least 70% to produce said first stream and recovering a condensate to produce said second stream.

8. The process according to claim 6, comprising evaporating said waste water by at least 90% to produce said first stream and recovering a condensate to produce said second stream.

9. The process according to claim 6, comprising passing said waste water through at least one filtration stage before feeding to said evaporator.

10. The process according to claim 6, comprising recycling said condensate from said evaporation to said waste water.

11. The process according to claim 10, further comprising feeding said condensate through an ion exchange device or membrane separation device before recycling to said waste water.

12. The process according to claim 1, comprising adding said ammonium solution or ammonia gas to said waste water in an amount to adjust the pH to between about 2 and about 8.

13. The process according to claim 1, comprising adding said ammonium solution or ammonia gas to said waste water in an amount to adjust the pH to between about 3 and about 5.

14. A process for regenerating an acid solution comprising the steps of
   admixing ammonia or an ammonium compound with a waste rinse water from a rinse station of a pickling plant, said rinse water containing dissolved metal salts and spent pickling acid to form a mixture,
   producing a concentrated first acid waste stream from said rinse water mixture where said first acid stream has a higher concentration of said metal salts than said rinse water, and producing a second stream containing metal salts, wherein said second stream has a concentration of said metal salts less than said first acid stream,
   thermally decomposing said concentrated first acid stream and regenerating an acid solution, and
   recycling said second stream to said rinse station of said pickling plant.

15. The process of claim 14, comprising evaporating said first acid stream to reduce the volume of said first acid stream by at least 70%.

16. The process of claim 15, comprising filtering said rinse water mixture prior to said evaporating step.

17. The process of claim 15, comprising evaporating at least about 50% of said rinse water to produce said first acid waste stream and recovering vapors from said evaporating step to produce said second waste stream.

18. The process of claim 14, comprising evaporating said first acid stream to reduce the volume of said first acid stream by at least 90%.

19. The process of claim 14, comprising admixing said ammonia or ammonium compound in an amount to adjust said rinse water to a pH of about 2 to about 8.

20. The process of claim 14, comprising admixing said ammonia or ammonium compound with said rinse water in an amount to adjust said spent pickling acid solution to a pH of about 3 to about 8.

21. The process of claim 14, comprising separating said rinse water mixture into said first acid waste stream having a first volume and said second waste stream having a second volume, wherein said first volume is less than said second volume.

22. The process of claim 14, comprising passing said rinse water through a membrane separation device and producing said first acid waste stream and said second stream.

23. The process of claim 22, wherein said membrane separation device is a reverse osmosis separation device.

24. The process of claim 22, further comprising evaporating said first acid waste stream to reduce the volume of said first acid waste stream by at least 50%.

25. The process of claim 24, comprising evaporating said first acid waste stream to reduce the volume of said first acid waste stream by at least 70%.

26. The process of claim 24, comprising evaporating said first acid waste stream to reduce the volume of said first acid waste stream by at least 90%.

27. A process for treating waste rinse water containing dissolved metals and acids and regenerating spent pickling acids, said process comprising the steps of:

pickling a steel substrate with a pickling acid, rinsing said steel substrate in a rinse station with a rinse water to form a waste rinse water containing pickling acids and dissolved metals, admixing a base with said waste rinse water where said base is selected from the group consisting of ammonia or an ammonia-producing compound, said base being admixed in an amount to react with said free acids and to raise the pH of said waste rinse water, separating said waste rinse water into a first acid waste stream containing a first concentration of metal salts and acids and a second stream containing a second concentration of metal salts, where said first concentration is higher than said second concentration, feeding said first acid waste stream to a pyrohydrolytic acid regenerator and regenerating an acid, and recycling said second stream to said rinse station.

28. The process of claim 27, comprising feeding said waste rinse water to an evaporator and evaporating at least 50% by volume of said waste rinse water to form said first acid waste stream and condensing vapors from said evaporation to form said second waste stream.

29. The process of claim 28, comprising admixing said base with said waste rinse water in an amount whereby said second waste stream contains about 1 mg/l or less $NO_3^-$.

30. The process of claim 28, comprising admixing said base with said waste rinse water in an amount whereby said second stream has a pH of at least 3.0.

31. The process of claim 27, comprising admixing said base with said waste rinse water in an amount whereby said second waste stream contains less than 1 mg/l $NO_3^-$ and has a pH of about 6.0 or higher.

32. The process of claim 31, wherein said pickling acids contain nitric acid.

* * * * *